United States Patent
Dobson et al.

(10) Patent No.: US 11,269,416 B2
(45) Date of Patent: Mar. 8, 2022

(54) TOUCH COMMUNICATION DEVICE

(71) Applicant: Google LLC, Mountain View, CA (US)

(72) Inventors: Kelly Elizabeth Dobson, Mountain View, CA (US); Rafeed A. Chaudhury, San Francisco, CA (US); Nicolai Munk Petersen, Sunnyvale, CA (US); Steve Albert Oh, San Francisco, CA (US); Demetrious Mark Harrington, Cambridge, MA (US); Ara Knaian, Newton, MA (US); Shahriar Khushrushahi, Cambridge, MA (US); Elena Koukina, Santa Clara, CA (US); Rachel Chaney, Nahant, MA (US); Veton Saliu, Somerville, MA (US); Yvan Stephane Pearson Lecours, Cambridge, MA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/624,649

(22) PCT Filed: Nov. 13, 2018

(86) PCT No.: PCT/US2018/060759
§ 371 (c)(1),
(2) Date: Dec. 19, 2019

(87) PCT Pub. No.: WO2019/099381
PCT Pub. Date: May 23, 2019

(65) Prior Publication Data
US 2020/0272237 A1 Aug. 27, 2020

Related U.S. Application Data

(60) Provisional application No. 62/586,682, filed on Nov. 15, 2017.

(51) Int. Cl.
| | | |
|---|---|---|
| *G06F 3/01* | (2006.01) | |
| *G06N 20/00* | (2019.01) | |
| *G06F 3/044* | (2006.01) | |
| *G06F 1/16* | (2006.01) | |
| *G06F 3/0488* | (2013.01) | |

(52) U.S. Cl.
CPC ............ *G06F 3/016* (2013.01); *G06F 1/163* (2013.01); *G06F 1/1652* (2013.01);
(Continued)

(58) Field of Classification Search
None
See application file for complete search history.

(56) References Cited

U.S. PATENT DOCUMENTS

| | | | |
|---|---|---|---|
| 2006/0166357 A1* | 7/2006 | Takayama | ........... B01L 3/50273 435/289.1 |
| 2010/0194705 A1* | 8/2010 | Kim | ...................... G06F 3/0416 345/173 |

(Continued)

OTHER PUBLICATIONS

Francheschi, et al., A System for Electrotactile Feedback "Using Electronic Skin and Flexible Matrix Electrodes: Experimental Evaluation", IEEE Transactions on Haptics, vol. 10, No. 2, Apr. 1, 2017, 12 pages.
(Continued)

*Primary Examiner* — Matthew Yeung
(74) *Attorney, Agent, or Firm* — Dority & Manning, P.A.

(57) ABSTRACT

The present disclosure provides touch communication devices that can convey touch information to a human user and/or receive touch information from the human user. As one example, a touch communication device can include a plurality of tactile units. The touch communication device can individually control each of the tactile units to apply a respective pressure to a surface adjacent to such tactile unit. For example, the touch communication device can control the plurality of tactile units to convey a touch communication to a human user that has the touch communication
(Continued)

device adjacent to a portion of his body. As another example, the touch communication device is configured to determine a counter-pressure applied to each tactile unit by the surface adjacent to such tactile unit. The touch communication device can generate information descriptive of a touch communication performed by the human user on the touch communication device.

19 Claims, 8 Drawing Sheets

(52) U.S. Cl.
CPC .......... *G06F 3/0445* (2019.05); *G06F 3/0488* (2013.01); *G06N 20/00* (2019.01); *G06F 2203/04105* (2013.01)

(56) References Cited

U.S. PATENT DOCUMENTS

| | | | | |
|---|---|---|---|---|
| 2012/0086666 | A1* | 4/2012 | Badaye | G06F 3/0416 345/174 |
| 2013/0198625 | A1* | 8/2013 | Anderson | G06F 3/016 715/701 |
| 2014/0354587 | A1* | 12/2014 | Mohindra | G06F 3/016 345/174 |
| 2015/0205417 | A1* | 7/2015 | Yairi | G06F 3/03547 345/173 |
| 2016/0026261 | A1* | 1/2016 | Cheng | G06F 3/0487 345/173 |
| 2017/0038793 | A1* | 2/2017 | Kailman | G06F 1/163 |
| 2017/0249041 | A1 | 8/2017 | Moller et al. | |

OTHER PUBLICATIONS

Huisman et al., "The TaSST: Tactile Sleeve for Social Touch", IEEE World Haptics Conference, Apr. 14, 2013, 6 pages.
International Search Report and Written Opinion for Application No. PCT/US2018/060759, dated Mar. 8, 2019, 14 pages.
Zhou et al., "Textile Pressure Mapping Sensor for Emotional Touch Detection in Human-Robot Interaction", Sensors, vol. 17, No. 11, Nov. 1, 2017, 16 pages.

* cited by examiner

TOUCH COMMUNICATION DEVICE

PRIORITY CLAIM

This application is based upon and claims the right of priority under 35 U.S.C. § 371 to International Application No. PCT/US2018/0060759 filed on Nov. 13, 2018, which claims priority to and the benefit of U.S. Provisional Patent Application No. 62/586,682, titled "Touch Communication Device," filed on Nov. 15, 2017. Applicant claims priority to and the benefit of each of such applications and incorporates all such applications herein by reference in their entirety.

FIELD

The present disclosure relates generally to electronic devices. More particularly, the present disclosure relates to a touch communication device configured to provide a touch sensation to a user.

BACKGROUND

The sense of touch allows one to experience different sensations such as: pleasure, pain, heat, cold, or other sensations. Thus, touch is an important aspect of how humans experience and interact with the world around them.

Touch communication refers to the ways and mechanisms by which people communicate and interact via the sense of touch. One of the most significant aspects of touch communication is the ability to convey non-verbal, inter-personal communication. Thus, touch communication can be an important component of interpersonal relationships.

Further, with the development of advanced computing technologies, touch communication has become a viable means for communication between a human and a machine. For example, a user can communicate a certain request to a computing device by providing a certain touch communication. As one example, a user can drag her finger upwards on a touch-sensitive display screen of a smartphone to request that the smartphone perform a scrolling operation on a document (e.g., email or webpage) displayed on the display screen.

SUMMARY

Aspects and advantages of embodiments of the present disclosure will be set forth in part in the following description, or can be learned from the description, or can be learned through practice of the embodiments.

One example aspect of the present disclosure is directed to a touch communication device that includes a plurality of tactile units, a plurality of capacitive sensors, and one or more processors. Each of the tactile units is individually controllable to apply a respective pressure to a surface adjacent to such tactile unit. Each of the plurality of tactile units is associated with at least one capacitive sensor that is configured to measure the capacitance of such tactile unit. The one or more processors are configured to determine a counter-pressure applied to each of the plurality of tactile units based on the capacitance measured by the at least one capacitive sensor associated with such tactile unit.

Another example aspect of the present disclosure is directed to a wearable touch communication device. The wearable touch communication device includes a plurality of tactile units. Each of the tactile units is individually controllable to apply a respective pressure to a surface adjacent to such tactile unit. The wearable touch communication device includes a plurality of capacitive sensors configured to measure a capacitance associated with each of the plurality of tactile units. Each of the plurality of tactile units is associated with at least one capacitive sensor configured to measure the capacitance of such tactile unit. The wearable touch communication device includes one or more non-transitory computer-readable media that store instructions that, when executed by one or more processors, cause the one or more processors to perform operations, the operations include determining a desired pressure for each of the plurality of tactile units, determining the capacitance measured by the at least one capacitive sensor associated with each of the plurality of tactile units, and controlling each tactile unit to apply its respective desired pressure based at least in part on the capacitance measured by the at least one capacitive sensor associated with such tactile unit.

Another example aspect of the present disclosure is directed to a computing system that includes a first touch communication device in physical communication with a first user and a second touch communication device in physical communication with a second user physically remote from the first user. The first touch communication device includes a first plurality of tactile units. Each tactile unit of the first plurality includes one or more capacitive sensors configured to measure a capacitance associated with such tactile unit. The second touch communication device includes a second plurality of tactile units. Each tactile unit of the second plurality includes an exertion unit configured to apply a respective pressure to a surface of the second user adjacent to such tactile unit based at least in part on the capacitance associated with a respective one of the first plurality of tactile units.

Other aspects of the present disclosure are directed to various systems, apparatuses, computer-implemented methods, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
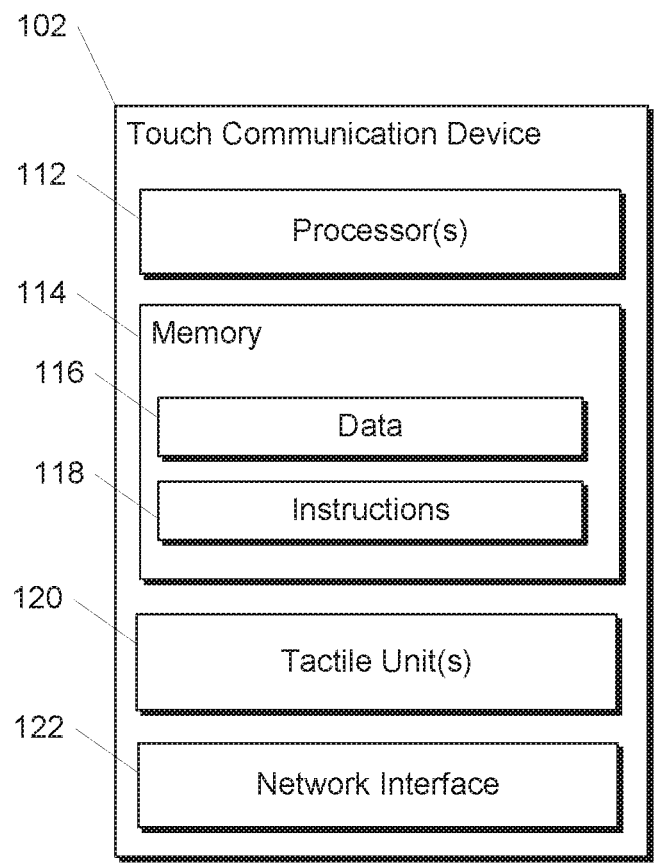
FIG. 1 depicts a block diagram of an example touch communication device according to example embodiments of the present disclosure.

Example aspects of the present disclosure are directed to touch communication devices that can, for example, convey touch information to a human user and/or receive touch information from the human user. As one example, a touch communication device can include a plurality of tactile units. The touch communication device can individually control each of the tactile units to apply a respective pressure to a surface adjacent to such tactile unit. For example, the touch communication device can control the plurality of tactile units to convey a touch communication to a human user that has the touch communication device adjacent to a portion of his body.

As another example, in some implementations, the touch communication device is capable of determining a counter-pressure applied to each tactile unit by the surface adjacent to such tactile unit. Thus, in such implementations, the touch communication device can generate information descriptive of a touch communication performed by the human user on the touch communication device.

Thus, in some example implementations, a user can press on a tactile unit, compressing it, and the touch communication device can register the applied counter pressure. In some implementations, the touch communication device can also cause a tactile unit to exert pressure onto the user. In some implementations, unlike traditional haptics devices (e.g., linear resonant actuators, eccentric rotating mass actuators, etc.) which generate a vibrating/buzzing sensation, the touch communication device can generate a wide band of low-frequency sensations, all the way down to zero frequency, giving it greatly improved fidelity and improved comfort as a touch communication device.

The example touch communication devices of the present disclosure can be used for a number of different applications. In one example, a pair of touch communication devices can be used to convey touch information between a pair of human users that are remotely located relative to each other. Thus, two or more touch communication devices can be used to provide natural, lifelike wireless touch communication across a distance. In some implementations, using two or more touch communication devices can provide the sensation or experience that the two communication partners can touch across a virtual touch communication plane. For example, it can be as if the two communication partners are sharing a virtual hoop of fabric, where applying pressure on one side of the fabric results in a deflection and pressure on the other side of the fabric, except that the two "sides" of the virtual fabric may be separated by thousands of miles. Such a system can allow people to virtually touch one another at a distance, optionally with other forms of communication such as simultaneous telephone, video, and/or virtual reality communication.

In another example, the touch communication device can be used to convey touch information between a human and a machine (e.g., a human machine interface). Further, the touch communication devices can allow touch signals to be recorded and/or replayed, enabling, for example, television, movies, video games, amusement park attractions, augmented reality experiences, and/or virtual reality experiences to be augmented with or otherwise include lifelike touch communications or interactions.

More particularly, example touch communication devices according to the present disclosure can include a plurality of tactile units. In some instances, the tactile units can be referred to as tactile pixels or "taxels." Each tactile unit can be individually controllable to exert a certain pressure (e.g., onto an adjacent surface such as, for example, a portion of a user's body such as a forearm) and/or capable of capturing information descriptive of a counter-pressure applied to such tactile unit (e.g., by an adjacent surface such as, for example, a portion of a user's body such as a hand).

In some implementations, all tactile units included in the device are the same size. In other implementations, various tactile units of the same device can have different sizes and/or be arranged according to different patterns, spacings, orientations, etc.

In some implementations, all tactile units included in the device can both exert pressure and capture information descriptive of an incoming touch (e.g., a counter-pressure). In other implementations, certain tactile units are operable only to exert pressure while others are operable only to measure an incoming touch (e.g., a counter-pressure). As one example, in some implementations, the touch communication device can have two sides: a first side that exerts a touch onto the user and a second side that receives a touch from the user. For example, the second side can be opposite to the first side. As an example, the first side can be placed adjacent to a body portion of the user (e.g., the user's left forearm) and the second side can be facing outward away from the body portion so that the user can touch the second side (e.g., with the user's right hand). However, in other implementations, all tactile units on both sides can both receive and convey touch communications.

Furthermore, in some implementations, the first side of the of the touch communication device can be physically distinct and/or movable independent of the second side of the touch communication device. As one example, the first side can be included in a first physical portion of the device while the second side can be included in a second physical portion of the device. The first physical portion and the second physical portion can be flexibly connected, pivotably connected, connected by wires, not physically connected (e.g., wirelessly connected), or other arrangements. Thus, in some implementations, the two sides of the touch communication device need not be self-contained in a singular form factor.

As examples, the touch communication device and/or the tactile units thereof can be mounted to a rigid or flexible surface. For example, the touch communication device can be a standalone device (e.g., physically separate from other items), or can be sewn into or otherwise physically integrated with other items such as clothing, the back of a watchband, a headband, an android, etc.

In some implementations, each tactile unit can be individually controllable to change the respective pressure applied by such tactile unit. Thus, the touch communication device can provide a higher pressure at certain tactile units but a lower pressure at other tactile units. By individually controlling each tactile unit in such fashion, the touch communication device can exert a spatially distinct and granular touch on a user. For example, a certain spatial pattern of a touch (e.g., a poke touch at a certain location) can be recreated by the touch communication device. Further, the tactile units can be controlled to change their applied pressure over time to convey a temporally changing touch pattern or action (e.g., a petting touch that moves from one location to another, a squeeze touch that increases and then decreases in pressure/strength, etc.).

In some implementations, each tactile unit can be individually controllable to provide a respective pressure within a certain pressure range (e.g., zero to a maximum pressure). For example, the touch communication device can modify (e.g., linearly modify) the respective pressure applied by each tactile unit within the available range.

Thus, in some implementations, the touch communication device can further include: one or more processors; and one or more non-transitory computer-readable media that store instructions that, when executed by the one or more processors, cause the one or more processors to perform operations. In particular, the operations can include determining a desired pressure for each of the plurality of tactile units and controlling each tactile unit to apply its respective desired pressure.

In some implementations, each tactile unit is individually controllable to change a respective texture associated with such tactile unit. For example, the touch communication device can control each tactile unit to harden, soften, become studded with one or more studs, become ridged with one or more ridges, become smooth, or have other tactile properties. The ability to change the texture of each tactile unit can be in addition or alternative to the ability to change the respective pressure applied by each tactile unit.

In some implementations, each of the plurality of tactile units can be actuatable. For example, each tactile unit can be movable or otherwise changeable between a first physical state and a second physical state, where the first state and second state have different respective pressures associated therewith. In some implementations, each of the plurality of tactile units can include a mechanical system that can be actuatable to apply the respective pressure by such tactile unit.

In some implementations, each of the plurality of tactile units can be inflatable and deflatable. For example, each tactile unit can include one or more chambers that are selectively and controllably fillable with a fluid such as a gas or liquid. For example, each tactile unit can include a flexible and/or elastic material that forms at least a portion of a perimeter of a chamber. Increasing the amount of fluid (e.g., gas or liquid) within the chamber can increase the pressure exerted by the corresponding tactile unit.

In some implementations, the touch communication device can further include one or more pumps that are controllable to cause inflation (or deflation) of selected ones of the plurality of tactile units. For example, the pump(s) can be pneumatic pumps and/or hydraulic pumps. As an example, in some implementations, the pump(s) can be resonant piezoelectric pump(s). For example, a resonant piezoelectric pump can be a microblower.

In some implementations, the touch communication device can include a single pump that can inflate the tactile units. The touch communication device can include control components (e.g., valves or the like) that limit or direct a flow of fluid generated by the pump to certain tactile units that are selected to be inflated (or deflated). In other implementations, the touch communication device can include a plurality of pumps. Each of the plurality of pumps can be individually controllable to inflate a respective one of the plurality of tactile units.

In some implementations, the touch communication device can further include one or more mufflers respectively positioned to attenuate sound respectively generated by the one or more pumps. For example, each of the one or more mufflers can be a labyrinth muffler. For example, each of the one or more mufflers can be affixed to an intake surface of the corresponding pump to attenuate the sound emitted from a rear of the pump.

In some implementations, the touch communication device can include one or more power circuits that are controllable to control power supply to the one or more pumps. For example, the power circuit(s) can be power amplifier circuit(s) or power switching circuit(s) (e.g., an H-bridge circuit). The touch communication device (e.g., a processor of the touch communication device) can control each power circuit to selectively drive power to the corresponding pump.

In some implementations, the touch communication device can include one or more pulse generating circuits that provide a pulse signal to the one or more pumps. For example, the pulse generating circuit(s) can be a peripheral to a processor (e.g., microprocessor) of the touch communication device. For example, the pulse generating circuit can drive a variable-frequency, variable duty-cycle signal. For example, the pulse signal (e.g., the variable-frequency, variable duty-cycle signal) can be provided to a piezoelectric element of the pump to drive the pump.

In some implementations, each tactile unit can include a plastic block. For example, the plastic block can contain a cylindrical channel, with the diameter of the channel sized such that a resonant frequency of the pump is at an anti-resonant node for transverse acoustic wave propagation in the channel.

In some implementations, each tactile unit can include a rear back-volume chamber. The rear back-volume chamber can be optionally sealed from the environment to reduce sound. In some implementations, the rear back-volume chamber can be relatively larger in volume than a front chamber.

In some implementations, each of the plurality of tactile units can be deformable. For example, each of the plurality of tactile units can be deformable in response to a counter-pressure applied by an adjacent surface onto such tactile unit.

In some implementations, each of the plurality of tactile units can include a chamber (e.g., a front chamber) formed from an elastic material, such as, for example, rubber. For example, the elastic material can be sealed to form a chamber that is inflatable, as described above. In one example, the elastic material can be sealed over the plastic block described above, such that the chamber is inflated when the pump is activated to inflate the tactile unit.

In some implementations, the touch communication device can further include an electrode positioned within the chamber. For example, the electrode can be a conductive (e.g., metallic) electrode. As an example, the electrode can be positioned on a top surface of the plastic block, inside the chamber (e.g., the flexible, front chamber).

In some implementations, the touch communication device can further include a fluid (e.g., gas or liquid) within the chamber (e.g., within the flexible front chamber) of each tactile unit. As an example, each tactile unit can include a hollow fiber with the fluid within the hollowed spaced of the fiber. The touch communication device can be configured to individually control a respective fluid pressure of the respective fluid within the respective chamber of each tactile unit.

In some implementations, each of the plurality of tactile units can include a shape-changing material. The touch communication device can be configured to individually control an amount of change associated with the respective shape-changing material included in each tactile unit. Example shape-changing materials include alloys, fiber-based materials, polymers, yarns, or other shape-changing materials. Example mechanisms by which the touch communication device can control the shape of the shape-changing materials include electrical currents, electrical fields, temperature fields, or other control signals.

In some implementations, each of the plurality of tactile units can include an electrically-conductive flexible layer. Each electrically-conductive flexible layer can be held at a ground potential. The electrically-conductive flexible layer can include an electrically-conductive coating and/or can be an electrically-conductive fabric. In one example, the electrically-conductive layer can be placed over (e.g., on an outer side of) a flexible front layer (e.g., a rubber layer).

In some implementations, each of the plurality of tactile units can include one or more capacitance sensors capable of measuring a capacitance associated with such tactile unit. In some implementations, each of the plurality of tactile units can include one or more capacitive sensors positioned to output sensor data indicative of the counter-pressure applied to such tactile unit. In addition or alternatively to the capacitive sensors, in some implementations, the touch communication device (e.g., each tactile unit thereof) can include other sensors or sensing mechanisms to determine the counter-pressure applied to each tactile unit. As examples, the additional sensors or sensing mechanisms can be resistive and/or optical in nature.

In some implementations, each of the plurality of tactile units can include one or more capacitive sensors positioned to output sensor data indicative of a displacement of such tactile unit by the surface adjacent to such tactile unit. For example, the capacitive sensors can output sensor data descriptive of a capacitance associated with such tactile unit and the touch communication device can determine the displacement of, deformation of, and/or counter-pressure applied to a tactile unit based on the sensor data descriptive of the capacitance associated with such tactile unit.

As one example, the touch communication device can determine an amount of displacement or deformation of a tactile unit based on the sensor data descriptive of the capacitance associated with such tactile unit and the touch communication device can determine the counter-pressure applied to such tactile unit based at least in part on the amount of displacement or deformation. For example, the touch communication device can consult a look-up table that provides the counter-pressure necessary to obtain a certain amount of displacement of a tactile unit given the current internal pressure associated with (e.g., pressure exerted by) the tactile unit.

As an example, the one or more capacitance sensors can include a capacitance measurement circuit that allows the touch communication device (e.g., a processor thereof) to measure an analog value of capacitance at each tactile unit. For example, the capacitance measurement circuit can be a resonant LC tank circuit.

In some implementations, each tactile unit can include a plurality of capacitive sensing electrodes. The touch communication device can be configured (e.g., by way of programmed instructions) to determine a combined value of a plurality of signals respectively received from the plurality of capacitive sensing electrodes. For example, the combined value of the plurality of signals can be an arithmetic mean of the plurality of signals. Inclusion of the plurality of capacitive sensing electrodes can enable a more uniform touch response versus position.

In some implementations, each of the plurality of tactile units can include a controllable heating element. As one example, the touch communication device can include a conductive fabric that contains heating elements in order to create thermal sensations. In some implementations, to improve the user perceived temperature change and to reduce power consumption of the device, the ambient temperature (e.g., the user's skin temperature or the environment's temperature) can be used to set the temperature range of the device. For instance, if the device is used outside in zero-degree temperatures or the user has cold hands, the device temperature range can be aligned to the measured ambient temp as opposed to heating or cooling the device to an absolute value.

In some implementations, the touch communication device can control the heating element in each tactile unit to provide an increased temperature sensation when the corresponding tactile unit is exerting an increased pressure. As one example, the increase in the temperature at a tactile unit can be proportional to the increase in the pressure exerted by such tactile unit. For example, a linear (e.g., one-to-one) increase relationship can be used, a step function relationship can be used, or some other linear or non-linear relationship can be used. As another example, the increase in the temperature at the tactile unit can be binary, such that the heating element of a tactile unit is activated when there is any increase in exerted pressure by such tactile unit above a baseline pressure and the heating element is deactivated when there the exerted pressure falls below a baseline pressure. The inclusion of heating elements can enable for heat/temperature information to be conveyed along with or as part of the touch communication, which can cause the touch communication to feel more lifelike.

In other implementations, the ability to change the temperature at each tactile unit can be alternative to the ability to change the respective pressure applied by each tactile unit. Thus, the temperature can be changed at a tactile unit without a corresponding change in the respective pressure applied by such tactile unit.

In some implementations, the touch communication device is able to be worn. For example, in some implementations, the touch communication device can be integrated into an article of clothing. As examples, the touch communication device can be sewn or otherwise embedded into or coupled to a glove, sleeve, shirt, hat, headband, bracelet, watch, or other article of clothing. The touch communication device can be positioned and oriented such that at least one touch exerting surface of the touch communication device is adjacent to (e.g., pressed against) a portion of a human user's body. As described above, the touch communication device can also optionally include a second surface that is opposite to the at least one touch exerting surface to receive touch input from the user.

In some implementations, the touch communication device can determine the desired pressure for each of the plurality of tactile units by receiving communication data that describes the desired pressure for each of the plurality of tactile units. As one example, the touch communication device can receive the communication data from a second touch communication device. For example, the desired pressure for each of the plurality of tactile units can be based at least in part on a respective counter-pressure applied to a respective one of a second plurality of tactile units included in the second touch communication device.

As described above, the touch communication device can be used in various systems to provide different touch experiences. In some implementations, the touch communication device enables touch communication between a human user and a machine. In some implementations, the touch communication device applies a touch action depicted by visual content to a human user.

In some implementations, the touch communication device enables touch communication between a first human user that is in physical contact with the touch communication device and a second human user that is in physical contact with a second touch communication device, the second human user remotely located relative to the first human user. As such, an example computing system can include a first touch communication device and a second touch communication device. The first touch communication device can be in physical communication with a first user. The second touch communication device can be in physical communication with a second user. The second user can be physically located remotely relative to the first user.

In some implementations, the first touch communication device can be configured to: detect that a counter-pressure of a first magnitude was applied by the first user to a first tactile unit of the first touch communication device and transmit data to the second touch communication device descriptive of the counter-pressure of the first magnitude applied to the first tactile unit. In some implementations, the second touch communication device can be configured to: receive the data transmitted by the first touch communication device and, in response to receipt of the data, control a second tactile unit of the second touch communication device to apply a pressure of a second magnitude.

In some implementations, the second magnitude can be based at least in part on the first magnitude. For example, the second magnitude can be equal to the first magnitude. In some implementations, a second location of the second tactile unit corresponds to a first location of the first tactile unit. Thus, the first user can press down on a particular tactile unit of the first touch communication device (e.g., as sensed by a capacitive sensor) and, in response, the second touch communication device can cause its correspondingly located tactile unit to exert a proportional amount of pressure.

In some implementations, the second touch communication device can be further configured provide a temperature change at the second tactile unit. In particular, the second touch communication device can be further configured to adjust a local temperature of the second tactile unit to a new value. For example, the new value can be determined based at least in part on the first magnitude of the counter-pressure applied to the first tactile unit of the first touch communication device.

In some example implementations of the present disclosure, the touch communication can be configured to perform a one-time or periodic calibration process. For example, the calibration process can be performed to create a look-up table of pressure exertion versus the capacitance level. As one example, the look-up table can describe pump inflation level versus capacitive sensor level. The look-up table can be stored in a local memory.

In some implementations, the calibration process can also generate a second look-up of counter pressure received versus capacitance level. As one example, the second look-up table can be used to convert a capacitance reading to a displacement value. Further, mathematical expressions or relationships can be derived as part of the calibration process in addition or alternatively to the look-up tables described above.

Thus, in one example, the touch communication device can convert a capacitance reading to an actual displacement using the second look-up table. The touch communication device can convert the current pressure exertion level (e.g., pump setting) to an expected displacement using the first look-up table. The touch communication device can subtract the actual displacement from the expected displacement, yielding a value proportional to the counter pressure of force currently be exerted by the user onto the tactile unit, independent of the current pressure exertion level.

In another example implementation of the present disclosure, a touch communication device can include a matrix of piezoelectric pumps. For example, the matrix of piezoelectric pumps can have been fabricated from a single sheet of piezoelectric material. The touch communication device can include a matrix of electrodes, with horizontal electrodes on one surface and vertical electrodes on an opposite surface. One or both of the matrices can be constrained by pressing against a plate with protruding bosses such that a set of individual regions that can be individually driven are formed. The pumps can then be driven by row and column drivers to display a matrix image of fluid flow. The matrices can be coupled to a single modeled piece of rubber, such that a large matrix touch display is formed from the system. For example, in such fashion, the touch communication device can include thousands of tactile units, without needing thousands of individual pieces to be constructed and combined.

In another example implementation of the present disclosure, a computing system can include a plurality of touch communication devices. For example, the plurality of touch communication devices can be ball shaped or spherical in nature. The outer surface of each sphere can include tactile units as described above. The computing system can include a localization system configured to determine a respective location associated with each touch communication device. For example, the localization system can be a nearest-neighbor short range communication system such that the balls can localize each other in position. In some implementations, each touch communication device can include an orientation measurement system such as, for example, a MEMS accelerometer. With an orientation system, each touch communication device can determine its own orientation.

By placing a large number of the touch communication devices described immediately above in a physical space (e.g., a "ball pit"), a user, who may optionally be wearing a virtual reality headset or otherwise engaged with a virtual reality experience can enter the physical space and experience realistic haptic sensations. For example, the user can feel resistance and/or heat upon touching virtual objects in the virtual reality.

With reference now to the Figures, example embodiments of the present disclosure will be discussed in further detail.

FIG. 1 depicts a block diagram of an example touch communication device 102 according to example embodiments of the present disclosure. The touch communication device 102 can include a plurality of tactile units 120. For example, some or all of the tactile units 120 can have or perform any of the features, components, operations, or other aspects described by the present disclosure.

The touch communication device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the touch communication device 102 to perform operations. For example, the processor 112 can execute the instructions 118 to control tactile units 120.

In some implementations, the data 116 stored in memory 114 can include touch data that describes a touch communication. For example, the data 116 can describe, for each of one or more tactile units, respective values, times/timings, locations for pressure to be exerted by the tactile units. As another example, the data 116 can describe, for each of one or more tactile units, respective values, times/timings, locations at which counter pressure was received by the tactile units. Thus, the data 116 can describe a pattern or sequence of touch actions to be performed or that has been performed.

In some implementations, the touch communication device 102 can also include one or more user additional input components beyond the tactile units that receive user input. For example, the additional user input component can be a touch-sensitive component (e.g., a touch-sensitive display screen or a touch pad) that is sensitive to the touch of a user input object (e.g., a finger or a stylus). Other example user input components include a microphone, a mouse, a trackball, etc. The user input component can also include other components that are able to receive user input by way of motion of a user input object. For example, the user input component can track the motion of a user input object through computer vision systems that analyze imagery collected by a camera of the device 102 or through the use of radar (e.g., miniature radar) to detect touchless gesture-based user input.

In some implementations, the touch communication device 102 can also include a display. For example, the display can be a touch-sensitive display screen. Thus, in some instances, the display can be a user input component. As examples, the display can be a liquid crystal display (LCD) or organic light-emitting diode (OLED) part of a touch screen, can be a non-touchscreen direct view display component such as a cathode ray tube (CRT), light-emitting diode (LED), LCD, or OLED. The display can also be a projector instead of a direct view display.

In some implementations, the touch communication device 102 can communicate with other computing devices (e.g., another touch communication device, a smart device, a server computing system, etc.) over a network. To do so, the touch communication device 102 can include and employ a network interface 122. The network interface 122 can include any suitable components for interfacing with one more networks, including for example, transmitters, receivers, ports, cards, controllers, antennas, or other suitable components.

A server computing system can include one or more processors and a memory. In some implementations, a server computing system includes or is otherwise implemented by one or more server computing devices. In instances in which the server computing system includes plural server computing devices, such server computing devices can operate according to sequential computing architectures, parallel computing architectures, or some combination thereof.

A network can be any type of communications network, such as a local area network (e.g., intranet), wide area network (e.g., Internet), or some combination thereof and can include any number of wired or wireless links. In general, communication over the network can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 2:
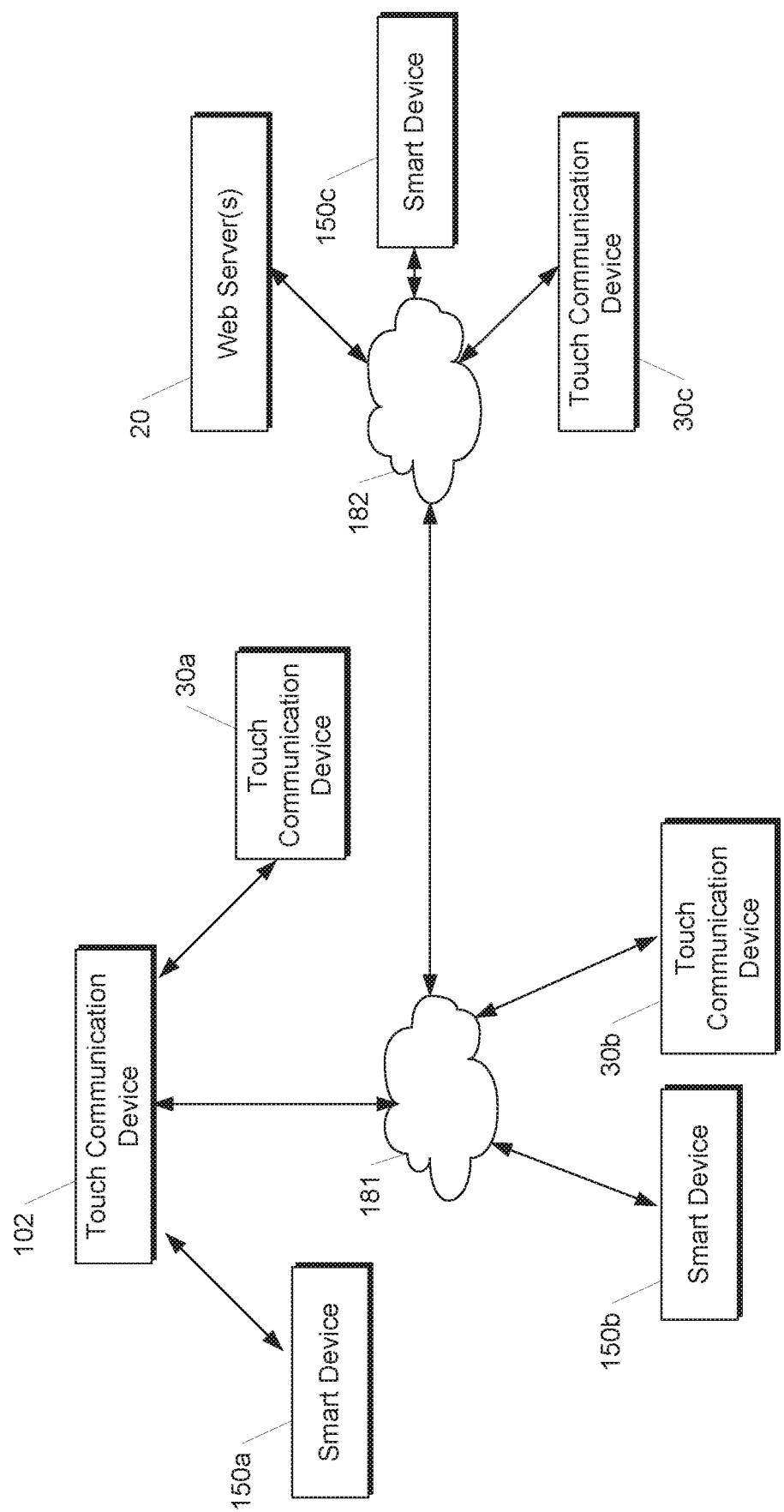
FIG. 2 depicts a block diagram of an example computing system according to example embodiments of the present disclosure.

FIG. 2 depicts a block diagram of an example computing system according to example embodiments of the present disclosure. FIG. 2 illustrates the touch communication device 102 in communication (e.g., wireless communication) with other computing devices, including a plurality of smart devices 150a-c, a plurality of additional touch communication devices 30a-c, and a web server 20.

Example smart devices can include smart, network-connected computing devices such as sound speakers, home alarms, door locks, cameras, lighting systems, treadmills, weight scales, smart beds, irrigation systems, garage door openers, appliances (e.g., refrigerator, HVAC, dishwasher, stove, etc.), baby monitors, fire alarms, or other smart computing devices. These devices can offer or provide various services or operations. For example, the services or operations can be performed by computer application(s) executed by the device(s). Smart devices are not required to be network connected.

The touch communication device 102 can communicate with the additional computing devices illustrated in FIG. 2 using a variety of different communications protocols, methods, hardware, etc., and combinations thereof. As one example, the touch communication device 102 can communicate with the smart device 150a and/or the touch communication device 30a using short range wireless communications techniques such as Bluetooth, ZigBee, Bluetooth Low Energy, infrared signals, optical signals, etc. As another example, the touch communication device can communicate with the smart device 150b and/or the touch communication device 30b over a local area network 181. For example, the local area network 181 can be a WiFi network. The touch communication device 102 can also communicate with other computing devices using wired connections such as, for example, Ethernet connections.

As another example, the touch communication device 102 can communicate with one or more web servers 20, an additional smart device 150c, and/or an additional touch communication device 30c over a wide area network 182. For example, the wide area network 182 can include the Internet, cellular networks, or the like. Communications between the touch communication device 102 and the one or more web servers 20, the additional smart device 150c, and/or the additional touch communication device 30c can flow through the local area network 181 but are not required to do so.

A user can interact with the touch communication device 102 to access or otherwise control one or more of the smart devices 150a-c or otherwise receive touch communications from the smart devices 150a-c. A user can also interact with the touch communication device 102 to send and/or receive touch communications to and/or from the additional touch communications devices 30a-c.

Figure 3:
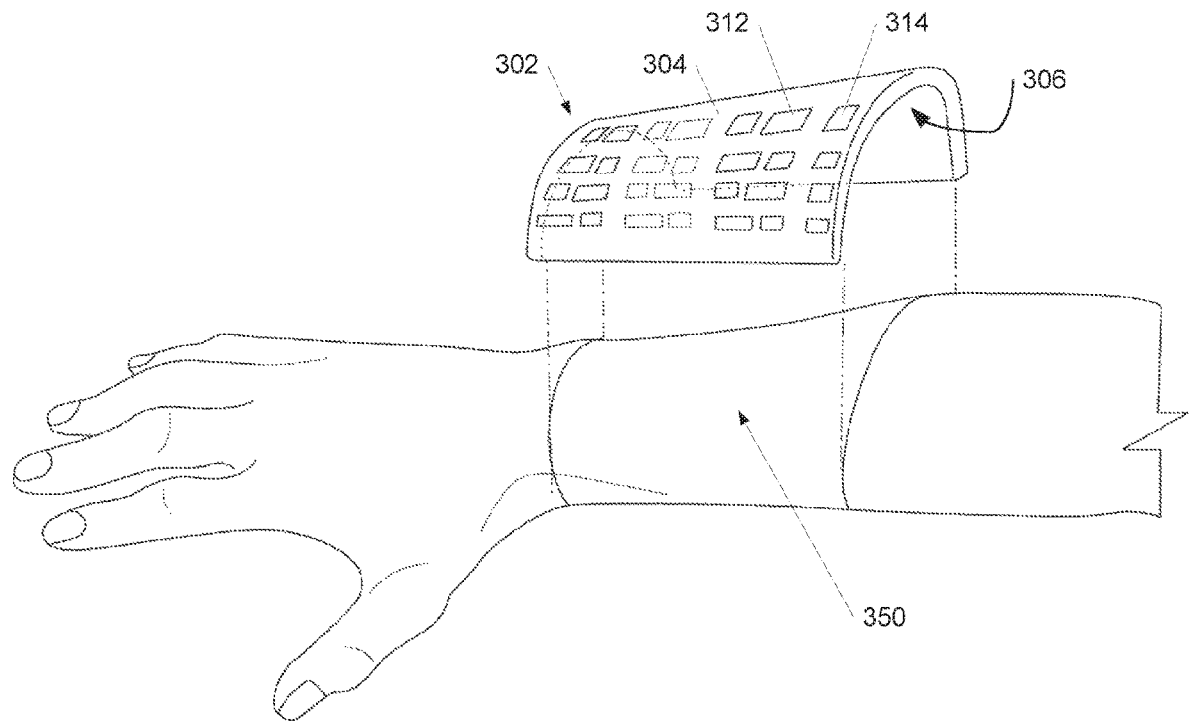
FIG. 3 depicts a graphical diagram of an example touch communication device according to example embodiments of the present disclosure.

FIG. 3 depicts a graphical diagram of an example touch communication device 302 according to example embodiments of the present disclosure. The touch communication device 302 is shown above a portion 350 of a human body that the touch communication device 302 will be positioned adjacent to. FIG. 3 provides one simplified example illustration for the purpose of illustrating and communicating certain aspects of the present disclosure. The present disclosure is not limited to the example simplified touch communication device 302 illustrated in FIG. 3.

The touch communication device 302 can include a plurality of tactile units. The tactile units can have or perform any of the features, components, operations, or other aspects described by the present disclosure.

In particular, in some implementations, each tactile unit can be individually controllable to exert a certain pressure (e.g., onto an adjacent surface such as, for example, a portion of a user's body such as a forearm) and/or capable of capturing information descriptive of a counter-pressure applied to such tactile unit (e.g., by an adjacent surface such as, for example, a portion of a user's body such as a hand).

In some implementations, all tactile units included in the touch communication device 302 can both exert pressure and capture information descriptive of an incoming touch (e.g., a counter-pressure). In other implementations, certain tactile units are operable only to exert pressure while others are operable only to measure an incoming touch (e.g., a counter-pressure).

Figure 4:
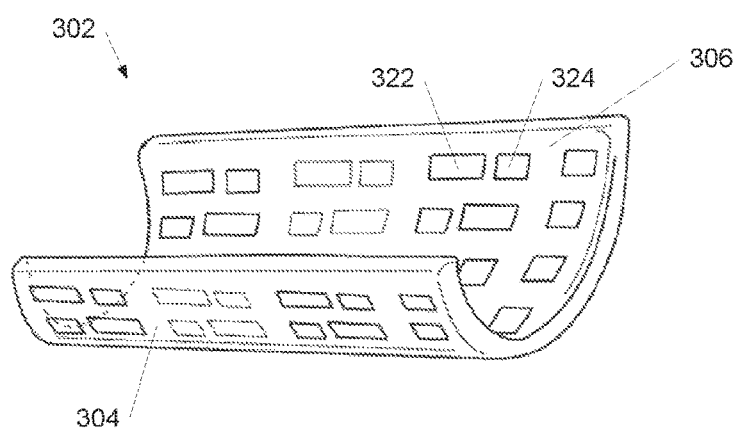
FIG. 4 depicts a graphical diagram of an underside of the example touch communication device illustrated in FIG. 3 according to example embodiments of the present disclosure.

As one example, as illustrated in FIGS. 3 and 4, the touch communication device can have two sides: a first side 306 that exerts a touch onto the user and a second side 304 that receives a touch from the user. The second side 304 can be opposite to the first side 306. As an example, the first side 306 can be placed adjacent to a body portion 350 of the user (e.g., the user's right forearm) and the second side 304 can be facing outward away from the body portion 350 so that the user can touch the second side 304 (e.g., with the user's left hand).

Each side 304 and 306 can include a plurality of tactile units. For example, as illustrated in FIG. 3, side 304 can have tactile units including, as examples, tactile units 312 and 314. Likewise, as illustrated in FIG. 4, side 306 can have tactile units including, as examples, tactile units 322 and 324.

In some implementations, the tactile units on side 304 (e.g., tactile units 312 and 314) can only receive touch communication; while the tactile units on side 306 (e.g., tactile units 322 and 324) can only convey touch communication. However, in other implementations, all tactile units on both sides 304 and 306 can both receive and convey touch communications.

According to some example aspects, a touch communication device may be used to facilitate interaction by a human or robotic user with external objects. By way of example, a touch communication device may be worn by a user with tactile units placed adjacent to the user's fingers. The tactile units may face outward from the user's fingers so as to external objects. By way of example, a tactile unit may be inflated and then a user may touch an object using the tactile unit. The capacitive sensor can determine a displacement associated with the tactile unit to determine a pressure exertion level. In some examples, a type of object or surface (e.g., hardness level) may be determined based on the interaction of the tactile unit with the object. In some implementations, tactile units may be additionally and/or alternatively be positioned adjacent to a surface of the user's fingers to receive and convey touch communications.

Figure 5:
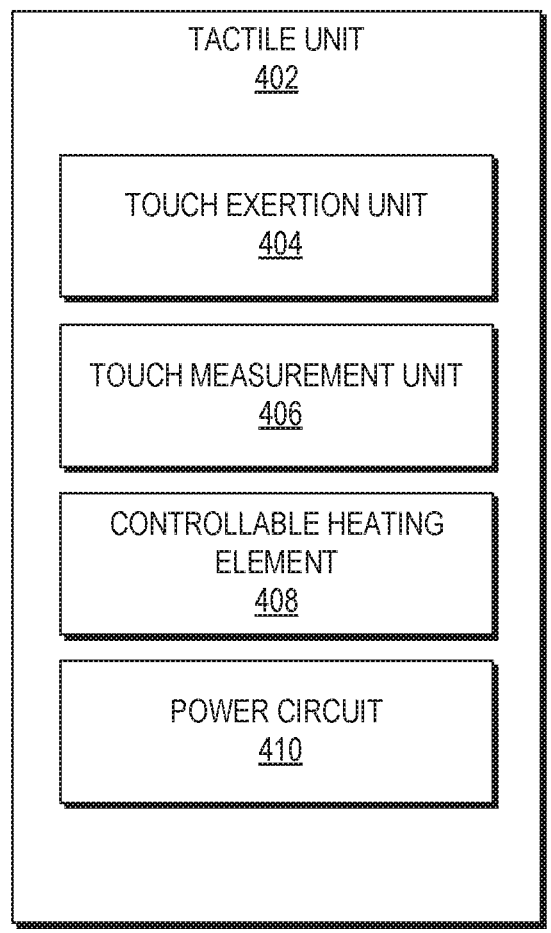
FIG. 5 depicts a block diagram of an example tactile unit according to example embodiments of the present disclosure.

FIG. 5 is a block diagram depicting an example tactile unit according to example embodiments of the present disclosure. Tactile unit 402 includes a touch exertion unit 404, a touch measurement unit 406, a controllable heating element 408, and a power circuit 410. FIG. 5 depicts one example of a tactile unit. It will be appreciated that a tactile unit 402 may include fewer or additional components than those depicted in FIG. 5.

Touch exertion unit 404 can exert touch such as pressure onto a surface of a user. As an example, a first side of a touch communication device including a tactile unit 402 may be adjacent to a surface of a user (e.g., the user's forearm) such that touch exertion unit 404 can exert pressure onto the surface of the user. Touch exertion unit 404 can include a pressure chamber that is selectively fillable with fluid in order to exert a pressure onto the surface of the user in some examples. Touch exertion unit 404 may additionally and/or alternatively include a shape changing material that can change shape to exert pressure on the surface of the user. Touch exertion unit 404 may additionally and/or alternatively include an electrically conductive flexible layer that can exert pressure in response to a signal from the touch communication device.

Touch measurement unit 406 can measure an incoming touch (e.g., a counter-pressure) from a user. As an example, a first side of a touch communication device can include one or more first tactile units 402 that exert the touch onto the user and a second side opposite to the first side can include one or more second tactile units 402 that measure an incoming touch (e.g., a counter-pressure). The second side can be facing outward away from the surface of the user (e.g., the user's forearm) so that the user can touch the second side (e.g., with user's hand). Touch measurement unit 406 can measure a counter-pressure provided to tactile unit 402 on the second side of the touch communication device by a user's hand.

Touch measurement unit 406 can include one or more capacitive sensors capable of measuring a capacitance associated with tactile unit 402. For example, a capacitive sensor can output sensor data descriptive of a capacitance associated with such tactile unit and the touch communication device can determine the displacement of, deformation of, and/or counter-pressure applied to a tactile unit based on the sensor data descriptive of the capacitance associated with such tactile unit. In addition or alternatively to the capacitive sensors, in some implementations, touch measurement unit 406 can include other sensors or sensing mechanisms to determine the counter-pressure applied to each tactile unit. As examples, the additional sensors or sensing mechanisms can be resistive and/or optical in nature.

In some examples, a tactile unit on the first side of the touch communication device includes a touch exertion unit 404 but not a touch measurement unit 406. Similarly, a tactile unit on the second side of the touch communication device can include a touch measurement unit 406 but not a touch exertion unit 404. In other examples, however, a tactile unit on one side of a touch communication device can both exert a touch and receive a touch communication.

Tactile unit 402 can include a controllable heating element 408. In some examples, tactile unit 402 does not include a controllable heating element 408. As one example, the touch communication device can include a conductive fabric that contains heating elements in order to create thermal sensations. In some implementations, the touch communication device can control the controllable heating element 408 in each tactile unit to provide an increased temperature sensation when the corresponding tactile unit is exerting an increased pressure or other touch. As one example, the increase in the temperature at a tactile unit can be proportional to the increase in the pressure exerted by such tactile unit. For example, a linear (e.g., one-to-one) increase relationship can be used, a step function relationship can be used, or some other linear or non-linear relationship can be used. As another example, the increase in the temperature at the tactile unit can be binary, such that the heating element of a tactile unit is activated when there is any increase in exerted pressure by such tactile unit above a baseline pressure and the heating element is deactivated when there the exerted pressure falls below a baseline pressure. The inclusion of heating elements can enable for heat/temperature information to be conveyed along with or as part of the touch communication, which can cause the touch communication to feel more lifelike.

In other implementations, the ability to change the temperature at each tactile unit can be alternative to the ability to change the respective pressure applied by each tactile unit. Thus, the temperature can be changed at a tactile unit without a corresponding change in the respective pressure applied by such tactile unit.

Tactile unit 402 can include a power circuit 410 that is controllable to control a power supply to the one or more pumps. Although a single power circuit 410 is shown, a tactile unit 402 may include additional power circuits. In example embodiments, the power circuit(s) can be power amplifier circuit(s) or power switching circuit(s) (e.g., an H-bridge circuit). The touch communication device (e.g., a processor of the touch communication device) can control each power circuit to selectively drive power to a corresponding pump, pulse generating circuit, controllable heating element, and/or other components of the tactile unit in example embodiments.

Figure 6:
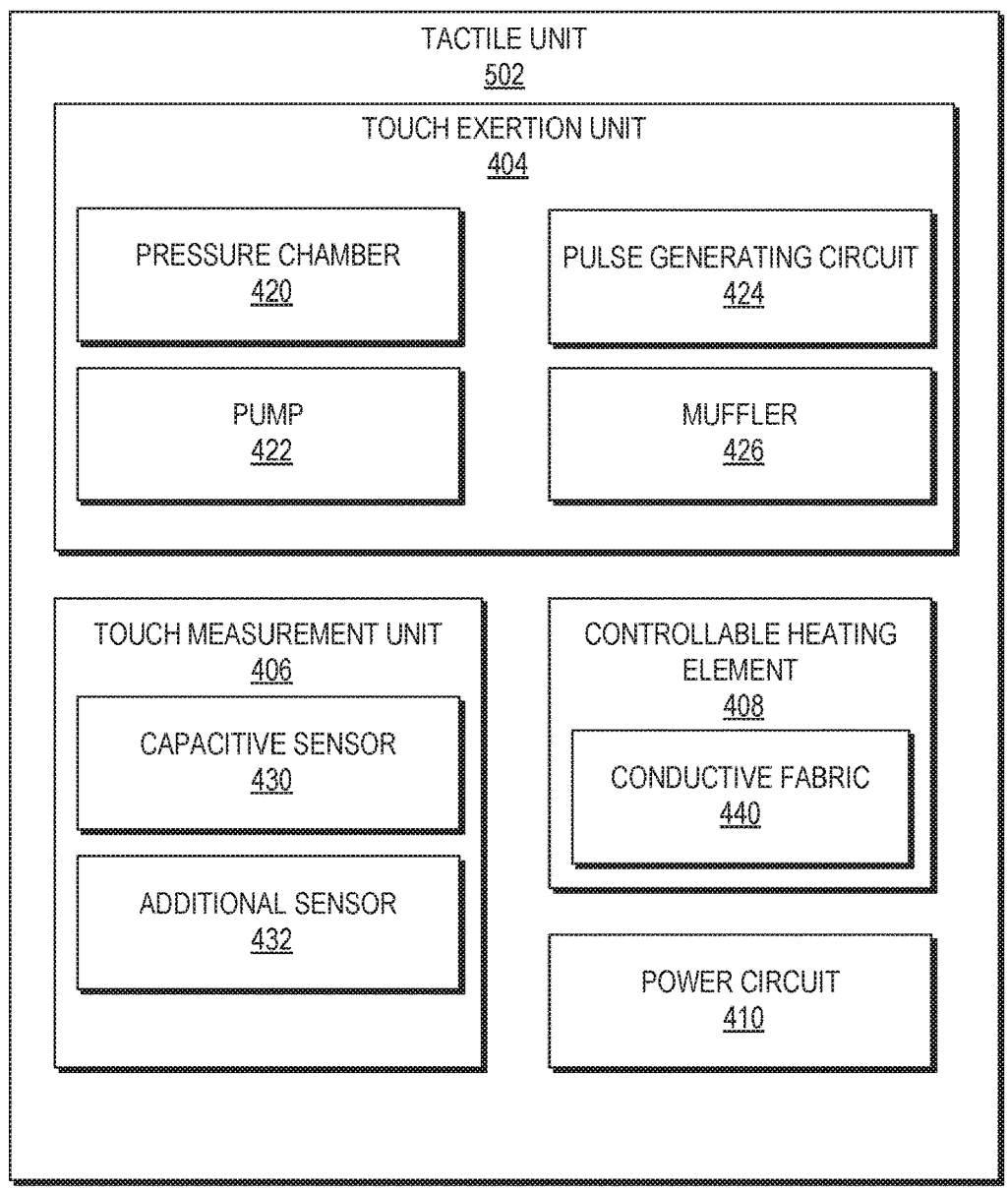
FIG. 6 depicts a block diagram of an example tactile unit according to example embodiments of the present disclosure.

FIG. 6 is a block diagram depicting an example tactile unit 502 according to example embodiments of the present disclosure. Tactile unit 502 includes a touch exertion unit 404, a touch measurement unit 406, a controllable heating element 408, and a power circuit 410 which can generally be implemented as earlier described. FIG. 6 depicts additional details of touch exertion unit 404, touch measurement unit 406, and controllable heating element 408 according to example embodiments. FIG. 6 depicts one example of a tactile unit. It will be appreciated that a tactile unit 502 may include fewer or additional components than those depicted in FIG. 6.

Touch exertion unit 404 includes a pressure chamber 420, pump 422, pulse generating circuit 424, and muffler 426. It will be appreciated that a touch exertion unit 404 may include fewer or additional components than those depicted in FIG. 6. For example, a touch exertion unit 404 may not include a pump 422 in some examples, such as where one pump is shared by two or more tactile units 502.

Touch exertion unit 404 can include a pressure chamber 420. In some examples, touch exertion unit 404 can include multiple pressure chambers 420. Pressure chamber 420 can be inflatable and deflatable. For example, chamber 420 can be selectively and controllably Tillable with a fluid such as a gas or liquid. For example, pressure chamber 420 can include a flexible and/or elastic material that forms at least a portion of a perimeter of a chamber 420. Increasing the amount of fluid (e.g., gas or liquid) within the chamber can increase the pressure exerted by the corresponding tactile unit.

Touch exertion unit 404 can include a pump 422. In some examples, touch exertion unit 404 may include multiple pumps 422. Pump 422 is controllable to cause inflation (or deflation) of selected ones of the plurality of tactile units 502. For example, the pump(s) 422 can be pneumatic pumps and/or hydraulic pumps. As an example, in some implementations, the pump(s) can be resonant piezoelectric pump(s). For example, a resonant piezoelectric pump can be a microblower.

In some implementations, the touch communication device can include a single pump that can inflate the tactile units. The touch communication device can include control components (e.g., valves or the like) that limit or direct a flow of fluid generated by the pump to certain tactile units that are selected to be inflated (or deflated). In other implementations, the touch communication device can include a plurality of pumps. Each of the plurality of pumps can be individually controllable to inflate a respective one of the plurality of tactile units.

Touch exertion unit 404 can include a pulse generating circuit 424. In some examples, touch exertion unit 404 may include multiple pulse generating circuits 424. Pulse generating circuit 424 provides a pulse signal to the one or more pumps 422. For example, the pulse generating circuit(s) 424 can be a peripheral to a processor (e.g., microprocessor) of the touch communication device. For example, the pulse generating circuit can drive a variable-frequency, variable duty-cycle signal. For example, the pulse signal (e.g., the variable-frequency, variable duty-cycle signal) can be provided to a piezoelectric element of the pump to drive the pump.

Touch exertion unit 404 can include a muffler 426. In some examples, touch exertion unit 404 may include multiple mufflers 426. Muffler 426 is respectively positioned to attenuate sound respectively generated by the one or more pumps 422. For example, each of the one or more mufflers 426 can be a labyrinth muffler. For example, each of the one or more mufflers can be affixed to an intake surface of the corresponding pump 422 to attenuate the sound emitted from a rear of the pump.

It is noted the components of touch exertion unit 404 are provided by way of example only, and that a touch exertion unit four six may include fewer or additional components than those depicted in FIG. 6. By way of example, in some implementations, a touch exertion unit 404 can include an electrically-conductive flexible layer. Each electrically-conductive flexible layer can be held at a ground potential. The electrically-conductive flexible layer can include an electrically-conductive coating and/or can be an electrically-conductive fabric. The electrically-conductive fabric can include fibers that become more or less rigid based on an applied electrical current, voltage, frequency, etc. In one example, the electrically-conductive layer can be placed over (e.g., on an outer side of) a flexible front layer (e.g., a rubber layer). The electrically conductive flexible layer can exert pressure on a surface of a user. For example, in response to a current, voltage, frequency or other electrical parameter provided to the electrically conductive flexible layer, the layer may constrict or expand to exert a pressure.

Touch measurement unit 406 includes a capacitive sensor 430. In some examples, touch measurement unit 406 may include multiple capacitive sensors. The capacitive sensor 430 is capable of measuring a capacitance associated with tactile unit 502. Capacitive sensor 430 can be positioned to output sensor data indicative of the counter-pressure applied to tactile unit 502. Capacitive sensor 430 can be positioned to output sensor data indicative of a displacement of tactile unit 502 by the surface adjacent to tactile unit 502. For example, the capacitive sensor 430 can output sensor data descriptive of a capacitance associated with tactile unit 502 and the touch communication device can determine the displacement of, deformation of, and/or counter-pressure applied to tactile unit 502 based on the sensor data descriptive of the capacitance associated with tactile unit 502.

Touch measurement unit 406 can additionally and/or alternatively include an additional sensor 432 or sensing mechanism to determine the counter-pressure applied to tactile unit 502. In some examples, touch measurement unit 406 may include multiple additional sensors. As examples, the additional sensors or sensing mechanisms can be resistive and/or optical in nature.

Controllable heating element 408 includes a conductive fabric 440. In some examples, controllable heating element 408 may include multiple conductive fabrics 440. In example embodiments, conductive fabric 440 contains heating elements in order to create thermal sensations.

Figure 7:
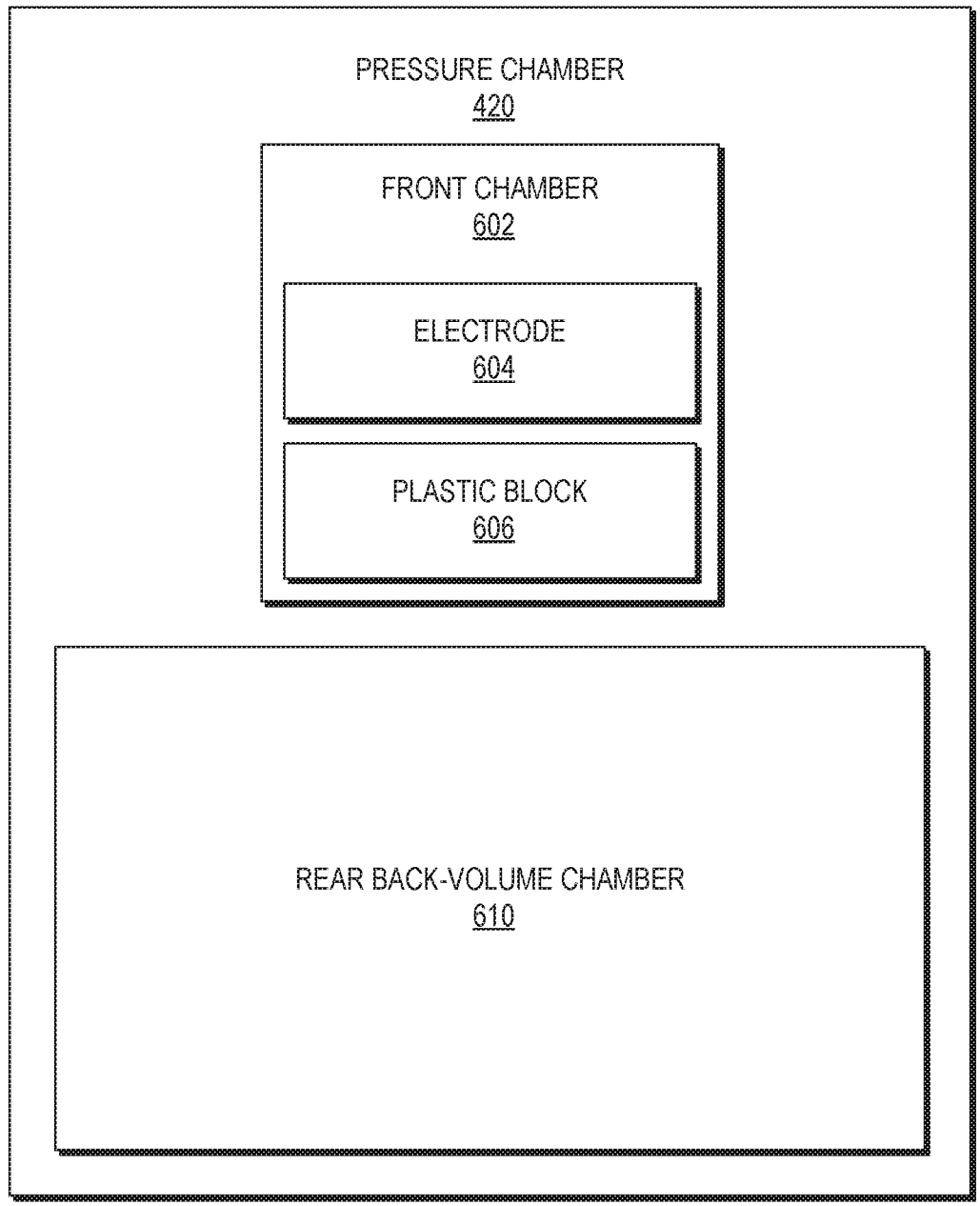
FIG. 7 depicts a block diagram of an example pressure chamber of an example tactile unit according to example embodiments of the present disclosure.

FIG. 7 is a block diagram depicting an example pressure chamber 420 according to example embodiments of the present disclosure. Pressure chamber 420 includes a front chamber 602 and a rear back volume chamber 610. In some examples, the front chamber 602 is an elastic front chamber. The rear back-volume chamber can be optionally sealed from the environment to reduce sound. In some implementations, the rear back-volume chamber can be relatively larger in volume than the front chamber 602.

Front chamber 602 can include a plastic block 606. For example, the plastic block 606 can contain a cylindrical channel, with the diameter of the channel sized such that a resonant frequency of the pump is at an anti-resonant node for transverse acoustic wave propagation in the channel. In some implementations, front chamber 602 can be deformable. For example, front chamber 602 can be deformable in response to a counter-pressure applied by an adjacent surface onto the tactile unit.

Front chamber 602 can be formed from an elastic material, such as, for example, rubber. For example, the elastic material can be sealed to form a chamber that is inflatable, as described above. In one example, the elastic material can be sealed over the plastic block 606, such that the chamber is inflated when the pump is activated to inflate the tactile unit.

In some implementations, the touch communication device can further include an electrode 604 positioned within the chamber 602. For example, the electrode 604 can be a conductive (e.g., metallic) electrode. As an example, the electrode can be positioned on a top surface of the plastic block 606, inside the front chamber 602.

In some implementations, the touch communication device can further include a fluid (e.g., gas or liquid) within the chamber (e.g., within the flexible front chamber 602) of each tactile unit. As an example, each tactile unit can include a hollow fiber with the fluid within the hollowed spaced of the fiber. The touch communication device can be configured to individually control a respective fluid pressure of the respective fluid within the respective chamber of each tactile unit.

In some implementations, each of the plurality of tactile units can include a shape-changing material. The touch communication device can be configured to individually control an amount of change associated with the respective shape-changing material included in each tactile unit. Example shape-changing materials include alloys, fiber-based materials, polymers, yarns, or other shape-changing materials. Example mechanisms by which the touch communication device can control the shape of the shape-changing materials include electrical currents, electrical fields, temperature fields, or other control signals.

Figure 8:
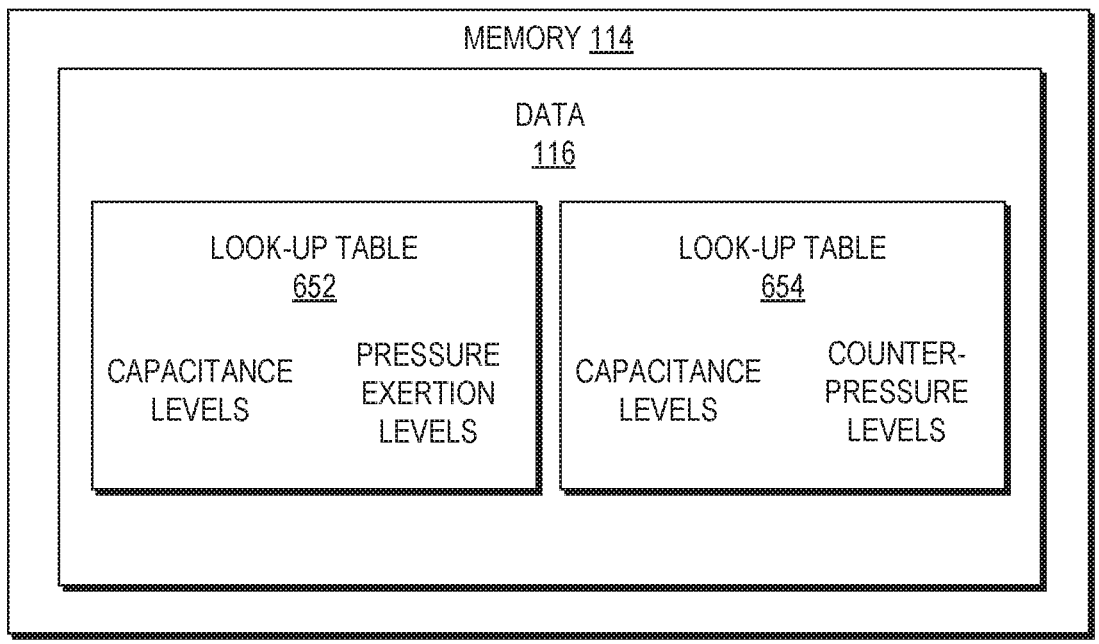
FIG. 8 depicts a block diagram of an example memory of a tactile communication device according to example embodiments of the present disclosure.

FIG. 8 is a block diagram of an example memory 114 according to example embodiments of the present disclosure. Memory 114 includes data 116. Data 116 includes a first look-up table 652 and a second look-up table 654. As one example, the look-up table 652 can describe pressure exertion levels (e.g., pump inflation level) versus capacitive sensor level. The look-up table can be stored in a local memory in some examples. In some example implementations, the touch communication can be configured to perform a one-time or periodic calibration process to generate the first look-up table 652.

As one example, the second look-up table 654 can describe counter-pressure received levels versus capacitive sensor level. The second look-up table 654 can be used to convert a capacitance reading to a displacement value. Further, mathematical expressions or relationships can be derived as part of the calibration process in addition or alternatively to the look-up tables described above.

Thus, in one example, the touch communication device can convert a capacitance reading to an actual displacement using the second look-up table. The touch communication device can convert the current pressure exertion level (e.g., pump setting) to an expected displacement using the first look-up table. The touch communication device can subtract the actual displacement from the expected displacement, yielding a value proportional to the counter pressure of force currently be exerted by the user onto the tactile unit, independent of the current pressure exertion level.

The touch communication device can determine an amount of displacement or deformation of a tactile unit based on the sensor data descriptive of the capacitance associated with such tactile unit and the touch communication device can determine the counter-pressure applied to such tactile unit based at least in part on the amount of displacement or deformation. For example, the touch communication device can consult the first look-up table 652 and/or second look-up table 654 to determine the counter-pressure necessary to obtain a certain amount of displacement of a tactile unit given the current internal pressure associated with (e.g., pressure exerted by) the tactile unit.

In some example implementations, one or more machine-learned models may be used to determine a pressure exertion based on a capacitance level. The machine-learned model(s) may provide one or more outputs including data indicative of a pressure exertion level or pump inflation level. The machine-learned model(s) can output data indicative of such levels in response to an input including a capacitance level from one or more capacitive sensors. The machine-learned model(s) can be stored in a local memory in example embodiments. The machine-learned model can be trained locally in some implementations. For example, the machine-learned model may be trained to determine appropriate pressure exertion levels for a particular user. In some implementations, the machine-learned model can be trained remotely. In some examples, a first machine-learned model can provide output data indicative of a pressure exertion level based on input data indicative of a capacitance level. A second machine-learned model can provide output data indicative of a counter pressure received versus capacitance level. As one example, the second machine-learned model can be used to convert a capacitance reading to a displacement value.

The touch communication device can convert a capacitance reading to an actual displacement using the second machine-learned model. The touch communication device can convert the current pressure exertion level (e.g., pump setting) to an expected displacement using the first machine-learned model. The touch communication device can subtract the actual displacement from the expected displacement, yielding a value proportional to the counter pressure of force currently exerted by the user onto the tactile unit, independent of the current pressure exertion level.

Figure 9:
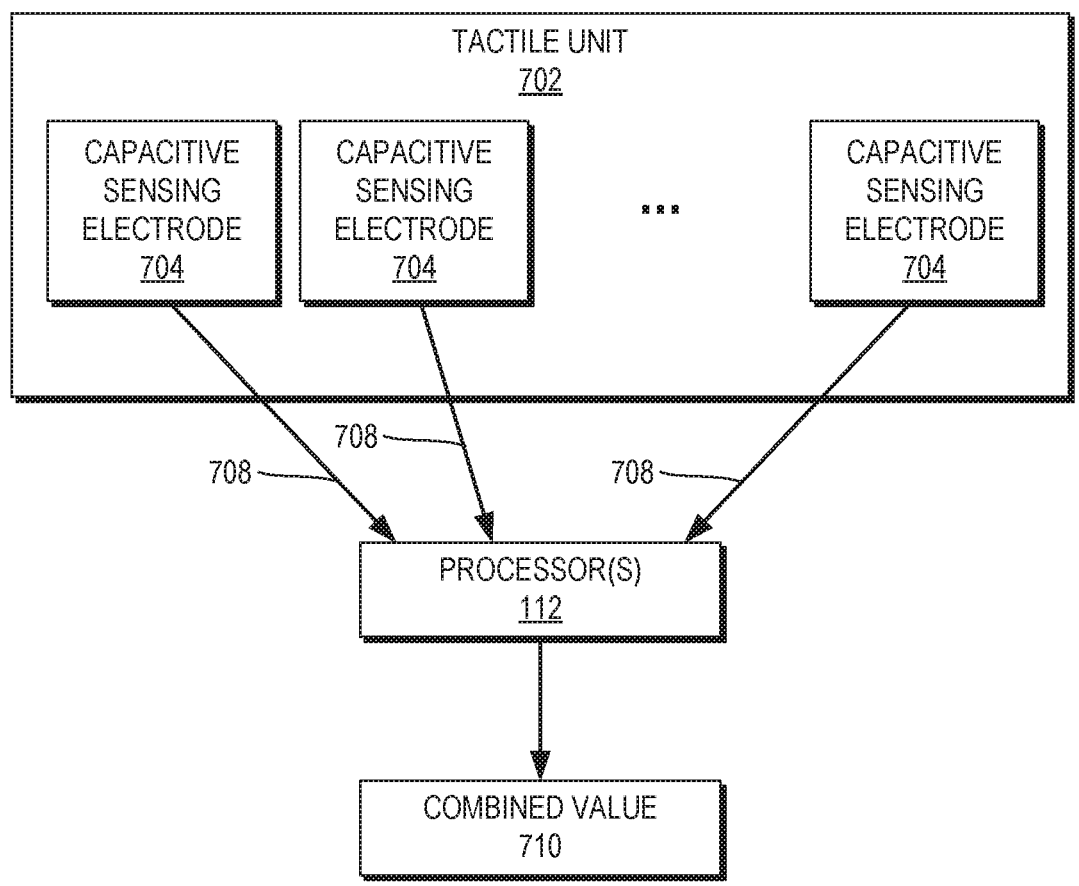
FIG. 9 depicts a block diagram of an example tactile unit according to example embodiments of the present disclosure.

FIG. 9 is a block diagram depicting an example tactile unit 702 according to example embodiments of the present disclosure. Tactile unit 702 includes a plurality of capacitive sensing electrodes 704. The touch communication device can be configured (e.g., by way of programmed instructions) to determine a combined value 710 of a plurality of signals 708 respectively received from the plurality of capacitive sensing electrodes 704. For example, the combined value of the plurality of signals can be an arithmetic mean of the plurality of signals. Inclusion of the plurality of capacitive sensing electrodes can enable a more uniform touch response versus position.

Accordingly, there has been described a touch communication device that comprises a plurality of tactile units. In some implementations, each of the tactile units is individually controllable to apply a respective pressure to a surface adjacent to such tactile unit. In some implementations, each tactile unit of the touch communication device can be individually controllable to change a respective texture associated with such tactile unit. In some implementations, each tactile unit can be individually controllable to change the respective pressure applied by such tactile unit. In some implementations, each tactile unit can be individually controllable to linearly modify the respective pressure applied by such tactile unit. In some implementations, each tactile unit can be actuatable.

Each of the plurality of tactile units can be inflatable in some implementations. The touch communication device can comprise one or more pumps that are controllable to inflate selected ones of the plurality of tactile units. In some examples, the touch communication device includes a plurality of pumps, wherein each of the plurality of pumps is individually controllable to inflate a respective one of the plurality of tactile units. In some implementations, the plurality of pumps includes a plurality of resonant piezoelectric pumps. In some implementations, the touch communication device includes a plurality of mufflers respectively positioned to attenuate sound respectively generated by the plurality of pumps.

In some implementations, each of the plurality of tactile units is deformable. In some implementations, each of the plurality of tactile units includes a chamber formed from an elastic material. In some implementations, each of the plurality of tactile units further includes an electrode positioned within the chamber. In some implementations, each of the plurality of tactile units further includes a fluid within the chamber. The touch communication device can be configured to individually control a respective fluid pressure of the respective fluid within the respective chamber of each tactile unit.

In some implementations, each of the plurality of tactile units includes a mechanical system that is actuatable to apply the respective pressure by such tactile unit. In some implementations, each of the plurality of tactile units comprises a shape-changing material. The touch communication device can be configured to individually control an amount of change associated with the respective shape-changing material included in each tactile unit.

In some implementations, each of the plurality of tactile units includes an electrically-conductive flexible layer. Each electrically-conductive flexible layer can be held at a ground potential in some examples.

In some implementations, each of the plurality of tactile units includes one or more capacitive sensors configured to measure a capacitance associated with such tactile unit. In some implementations, the touch communication device is configured to determine a counter-pressure applied to each tactile unit by the surface adjacent to such tactile unit. In some implementations, each of the plurality of tactile units includes one or more capacitive sensors positioned to output sensor data indicative of the counter-pressure applied to such tactile unit. In some implementations, each of the plurality of tactile units includes one or more capacitive sensors positioned to output sensor data indicative of a displacement of such tactile unit by the surface adjacent to such tactile unit.

In some implementations, each of the plurality of tactile units comprises a controllable heating element.

According to some aspects, a touch communication device according to example embodiments of the present disclosure can include one or more processors and one or more non-transitory computer-readable media that store instructions that, when executed by the one or more processors, cause the one or more processors to perform operations. The operations can include determining a desired pressure for each of the plurality of tactile units, and controlling each tactile unit to apply its respective desired pressure.

In some implementations controlling each tactile unit comprises controlling an inflation level of each tactile unit. In some implementations, determining the desired pressure for each of the plurality of tactile units comprises receiving communication data that describes the desired pressure for each of the plurality of tactile units. In some implementations, receiving the communication data comprises receiving the communication data from a second touch communication device. In some implementations, receiving the communication data comprises receiving the communication data from a second touch communication device. In some implementations, the desired pressure for each of the plurality of tactile units is based at least in part on a respective counter-pressure applied to a respective one of a second plurality of tactile units included in the second touch communication device.

In some implementations, the touch communication device enables touch communication between a human user and a machine. In some implementations, the touch communication device enables touch communication between a first human user that is in physical contact with the touch communication device and a second human user that is in physical contact with a second touch communication device, the second human user remotely located relative to the first human user. In some implementations, the touch communication device applies a touch action depicted by visual content to a human user.

In some implementations, the touch communication device is able to be worn. In some implementations, the touch communication device is integrated into an article of clothing.

According to some aspects of the present disclosure, a computing system is provided that includes a first touch communication device in physical communication with a first user, and a second touch communication device in physical communication with a second user. The second user can be physically located remotely relative to the first user.

In some implementations, the first touch communication device is configured to detect that a counter-pressure of a first magnitude was applied by the first user to a first tactile unit of the first touch communication device, and transmit data to the second touch communication device descriptive of the counter-pressure of the first magnitude applied to the first tactile unit. The second touch communication device can be configured to receive the data transmitted by the first touch communication device, and in response to receipt of the data, control a second tactile unit of the second touch communication device to apply a pressure of a second magnitude.

In some implementations, the second magnitude is based at least in part on the first magnitude. In some implementations, the second magnitude is equal to the first magnitude. In some implementations, a second location of the second tactile unit corresponds to a first location of the first tactile unit.

In some implementations, the second touch communication device is further configured provide a temperature change at the second tactile unit. In some implementations, the second touch communication device is further configured to adjust a local temperature of the second tactile unit to a new value. The new value can be determined based at least in part on the first magnitude of the counter-pressure applied to the first tactile unit of the first touch communication device.

According to some aspects of the present disclosure, a computing system is provided that includes a plurality of touch communication devices, and a localization system configured to determine a respective location associated with each touch communication device. In some implementations, each touch communication device comprises an orientation measurement system.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A touch communication device, comprising:
   a plurality of tactile units, wherein each of the tactile units is individually controllable to apply a respective pressure to a surface adjacent to such tactile unit;
   a plurality of capacitive sensors configured to measure a capacitance associated with each of the plurality of tactile units, wherein each of the plurality of tactile units is associated with at least one capacitive sensor configured to measure the capacitance of such tactile unit; and
   one or more processors configured to determine a counter-pressure applied to each of the plurality of tactile units based at least in part on the capacitance measured by the at least one capacitive sensor associated with such tactile unit and transmit data to a second touch communication device descriptive of the counter-pressure of a first magnitude applied to a first tactile unit of the plurality of tactile units, wherein the second communication device is configured to receive the data and in response to receipt of the data, control at least one tactile unit of the second communication device to apply a pressure of a second magnitude.

2. The touch communication device of claim 1, wherein the at least one capacitive sensor associated with each of the tactile units is positioned to output sensor data descriptive of the capacitance associated with such tactile unit.

3. The touch communication device of claim 2, wherein the one or more processors are configured to determine the counter-pressure applied to each of the tactile units based at least in part on the sensor data descriptive of the capacitance associated with such tactile unit.

4. The touch communication device of claim 1, further comprising:
   at least one memory comprising one or more look-up tables that include data indicative of the counter-pressure associated with the capacitance measured by the plurality of capacitive sensors;
   wherein the one or more processors is configured to determine the counter-pressure applied to each of the tactile units using the one or more look-up tables.

5. The touch communication device of claim 4, wherein:
   the one or more look-up tables include data indicative of pressure exertion associated with the capacitance measured by the plurality of capacitive sensors.

6. The touch communication device of claim 1, wherein:
   each of the plurality of capacitive sensors includes a plurality of sensing electrodes;
   wherein the one or more processors is configured to determine a combined value of a plurality of signals respectively received from the plurality of sensing electrodes.

7. The touch communication device of claim 1, wherein each of the plurality of tactile units comprises an electrically-conductive flexible layer configured to apply the respective pressure for each tactile unit.

8. The touch communication device of claim 1, wherein each tactile unit is individually controllable to linearly modify the respective pressure applied by such tactile unit.

9. The touch communication device of claim 1, further comprising:
   one or more pumps that are controllable to inflate selected ones of the plurality of tactile units; and
   a plurality of mufflers respectively positioned to attenuate sound respectively generated by the plurality of pumps.

10. The touch communication device of claim 1, further comprising a plurality of resonant piezoelectric pumps, wherein each of the plurality of resonant piezoelectric pumps is individually controllable to inflate a respective one of the plurality of tactile units.

11. The touch communication device of claim 1, wherein each of the plurality of tactile units comprises a chamber formed from an elastic material and an electrode positioned within the chamber.

12. The touch communication device of claim 11, wherein each of the plurality of tactile units further comprises a fluid within the chamber, and wherein the touch communication device is configured to individually control a respective fluid pressure of the respective fluid within the respective chamber of each tactile unit.

13. The touch communication device of claim 1, wherein each of the plurality of tactile units comprises a mechanical system that is actuatable to apply the respective pressure by such tactile unit.

14. The touch communication device of claim 1, wherein:
- each of the plurality of tactile units comprises a shape-changing material; and
- the touch communication device is configured to individually control an amount of change associated with the respective shape-changing material included in each tactile unit.

15. The touch communication device of claim 1, wherein:
- the plurality of tactile units is a first plurality of tactile units disposed on a first side of the touch communication device; and
- the touch communication device includes a second plurality of tactile units disposed on a second side of the touch communication device opposed to the first side.

16. A wearable touch communication device, comprising:
- a plurality of tactile units, wherein each of the tactile units is individually controllable to apply a respective pressure to a surface of a first user adjacent to such tactile unit;
- a plurality of capacitive sensors configured to measure a capacitance associated with each of the plurality of tactile units, wherein each of the plurality of tactile units is associated with at least one capacitive sensor configured to measure the capacitance of such tactile unit; and
- one or more non-transitory computer-readable media that store instructions that, when executed by one or more processors, cause the one or more processors to perform operations, the operations comprising:
  - receiving data transmitted by a second touch communication device, the data descriptive of a counter-pressure of a first magnitude applied by a second user to at least one tactile unit of the second touch communication device;
  - determining a desired pressure for each of the plurality of tactile units, wherein determining the desired pressure for a first tactile unit of the plurality of tactile units includes determining a second magnitude for the desired pressure of the first tactile unit based at least in part on the first magnitude of the counter-pressure applied by the second user to the at least one tactile unit of the second touch communication device;
  - determining the capacitance measured by the at least one capacitive sensor associated with each of the plurality of tactile units; and
  - controlling each tactile unit to apply its respective desired pressure based at least in part on the capacitance measured by the at least one capacitive sensor associated with such tactile unit.

17. The wearable touch communication device of claim 16, wherein:
- determining the desired pressure for each of the plurality of tactile units comprises receiving communication data that describes the desired pressure for each of the plurality of tactile units from a second touch communication device; and
- the desired pressure for each of the plurality of tactile units is based at least in part on a respective counter-pressure applied to a respective one of a second plurality of tactile units included in the second touch communication device.

18. The wearable touch communication device of claim 16, further comprising:
- at least one memory comprising one or more machine-learned models that provide data indicative of the counter-pressure associated with the capacitance measured by the plurality of capacitive sensors;
- wherein the one or more processors are configured to determine the counter-pressure applied to each of the tactile units using the one or more machine-learned models.

19. A computing system, comprising:
- a first touch communication device in physical communication with a first user, the first touch communication device comprising a first plurality of tactile units, each tactile unit of the first plurality including one or more capacitive sensors configured to measure a capacitance associated with such tactile unit, wherein the first touch communication device is configured to detect that a counter-pressure of a first magnitude was applied by the first user to a first tactile unit of the first plurality based at least in part on sensor data from the one or more capacitive sensors of such tactile unit and transmit data to a second touch communication device descriptive of the counter-pressure of the first magnitude applied to the first tactile unit; and
- the second touch communication device in physical communication with a second user physically remote from the first user, the second touch communication device comprising a second plurality of tactile units, each tactile unit of the second plurality including an exertion unit configured to apply a respective pressure to a surface of the second user adjacent to such tactile unit based at least in part on the capacitance associated with a respective one of the first plurality of tactile units, the second communication device configured to receive the data transmitted by the first touch communication device and in response to receipt of the data, control a second tactile unit of the second plurality of tactile units of the second touch communication device to apply a pressure of a second magnitude.

* * * * *